(12) United States Patent
Jan et al.

(10) Patent No.: US 7,713,513 B2
(45) Date of Patent: May 11, 2010

(54) HIGH SILICA ZEOLITES: UZM-8HS

(75) Inventors: Deng-Yang Jan, Elk Grove Village, IL (US); Jaime G. Moscoso, Mount Prospect, IL (US); Susan C. Koster, Carpentersville, IL (US); Lisa M. Knight, Chicago, IL (US); Gregory J. Lewis, Santa Cruz, CA (US); Mark A. Miller, Niles, IL (US); R. Lyle Patton, Surprise, AZ (US); Stephen T. Wilson, Libertyville, IL (US)

(73) Assignee: UOP LLC, Des Plaines, IL (US)

( * ) Notice: Subject to any disclaimer, the term of this patent is extended or adjusted under 35 U.S.C. 154(b) by 1141 days.

(21) Appl. No.: 11/340,914

(22) Filed: Jan. 27, 2006

(65) Prior Publication Data

US 2006/0159615 A1 Jul. 20, 2006

Related U.S. Application Data

(63) Continuation-in-part of application No. 10/395,624, filed on Mar. 21, 2003, now abandoned.

(51) Int. Cl.
C01B 39/04 (2006.01)
C01B 39/06 (2006.01)
C01B 39/08 (2006.01)
C01B 39/46 (2006.01)
C01B 39/48 (2006.01)

(52) U.S. Cl. .............. 423/718; 423/705; 423/707; 423/708; 423/713; 423/714

(58) Field of Classification Search .......... 423/329.1, 423/713, 718, 705, 707, 708, 714; 502/85, 502/86; 208/111.01
See application file for complete search history.

(56) References Cited

U.S. PATENT DOCUMENTS

| | | | |
|---|---|---|---|
| 4,610,856 A | 9/1986 | Skeels et al. ............... 423/328 |
| 4,826,667 A | 5/1989 | Zones et al. ............... 423/277 |
| 5,310,715 A | 5/1994 | Kresge et al. ............... 502/84 |
| 5,827,491 A | 10/1998 | Emerson et al. ........... 423/328.2 |
| 6,569,401 B1 | 5/2003 | Elomari ..................... 423/718 |
| 6,613,302 B1 | 9/2003 | Moscoso et al. ............ 423/718 |
| 6,713,041 B1 | 3/2004 | Moscoso et al. ............ 423/705 |
| 6,756,030 B1 | 6/2004 | Rohde et al. ............... 423/718 |
| 7,091,390 B2 * | 8/2006 | Jan et al. .................... 585/467 |
| 7,405,177 B2 * | 7/2008 | Galperin et al. ............ 502/214 |
| 7,407,907 B2 * | 8/2008 | Galperin et al. ............ 502/64 |
| 2003/0180217 A1 | 9/2003 | Canos et al. ............... 423/718 |
| 2003/0211034 A1 | 11/2003 | Wilson et al. .............. 423/713 |
| 2004/0182744 A1 * | 9/2004 | Jan et al. ................ 208/111.01 |
| 2004/0199036 A1 * | 10/2004 | Jan et al. .................... 585/467 |
| 2005/0101474 A1 * | 5/2005 | Galperin et al. ............ 502/64 |
| 2005/0101819 A1 * | 5/2005 | Galperin et al. ............ 585/752 |
| 2006/0063958 A1 * | 3/2006 | Galperin et al. ............ 585/752 |
| 2006/0159615 A1 * | 7/2006 | Jan et al. .................... 423/718 |
| 2006/0247480 A1 * | 11/2006 | Jan et al. .................... 585/467 |
| 2006/0281628 A1 * | 12/2006 | Galperin et al. ............ 502/60 |
| 2006/0281957 A1 * | 12/2006 | Galperin et al. ............ 585/353 |
| 2008/0249346 A1 * | 10/2008 | Galperin et al. ............ 585/752 |

OTHER PUBLICATIONS

D.W. Breck, *Zeolite Molecular Sieves*, Wiley and Sons, New York, (1974), p. 441.

* cited by examiner

*Primary Examiner*—David M Brunsman
(74) *Attorney, Agent, or Firm*—Frank S Molinaro

(57) ABSTRACT

A family of crystalline aluminosilicate zeolites designated UZM-8HS and derived from UZM-8 have been synthesized. The aluminum content of the UZM-8HS is lower than that of the starting UZM-8 thus changing its ion exchange capacity and acidity. These UZM-8HS are represented by the empirical formula:

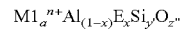

$$M1_a^{n+}Al_{(1-x)}E_xSi_yO_{z''}$$

and are prepared by treatments such as acid extraction and AFS treatments.

19 Claims, No Drawings

HIGH SILICA ZEOLITES: UZM-8HS

CROSS-REFERENCE TO RELATED APPLICATION

This application is a continuation-in-part of copending application Ser. No. 10/395,624, filed Mar. 21, 2003, and which is incorporated by reference in its entirety.

FIELD OF THE INVENTION

This invention relates to a family of crystalline aluminosilicate UZM-8HS zeolites, which are derived from UZM-8 zeolites. The aluminum content of the UZM-8HS is lower than that of the starting UZM-8 thus changing its ion exchange capacity and acidity.

BACKGROUND OF THE INVENTION

Zeolites are crystalline aluminosilicate compositions which are microporous and which are formed from corner sharing $AlO_2$ and $SiO_2$ tetrahedra. Numerous zeolites, both naturally occurring and synthetically prepared are used in various industrial processes. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure.

The number of synthetic zeolites is well over a hundred as evidenced by the *Atlas of Zeolite Framework Types* published by the Structure Commission of the International Zeolite Association (IZA). As is well known, zeolites are distinguished from each other on the basis of their composition, crystal structure, catalytic and adsorption properties. One method commonly used in the art to distinguish zeolites is x-ray diffraction.

In U.S. Pat. No. 6,756,030 B1, a new family of materials designated UZM-8 is disclosed. The UZM-8 materials are zeolitic aluminosilicates ranging in Si/Al ratio from 6.5 to 35. They are prepared from reaction mixtures employing organoammonium structure directing agents with preferred examples being diethyldimethylammonium (DEDMA), ethyltrimethylammonium (ETMA), and hexamethonium (HM) cations and optionally alkali or alkaline earth metals and/or other organoammonium cations. The UZM-8 materials have a unique x-ray diffraction pattern and a composition on an as synthesized and anhydrous basis expressed by an empirical formula of:

where M is at least one exchangeable cation selected from the group consisting of alkali and alkaline earth metals, "m" is the mole ratio of M to (Al+E) and varies from 0 to about 2.0, R is at least one organoammonium cation selected from the group consisting of quaternary ammonium cations, diquaternary ammonium, protonated amines, protonated diamines, protonated alkanolamines and quaternized alkanolammonium, "r" is the mole ratio of R to (Al+E) and has a value of about 0.05 to about 5.0, "n" is the weighted average valence of M and has a value of about 1 to about 2, "p" is the weighted average valence of R and has a value of about 1 to about 2, E is an element selected from the group consisting of gallium, iron, boron, chromium, indium and mixtures thereof, "x" is the mole fraction of E and has a value from 0 to about 1.0, "y" is the mole ratio of Si to (Al +E) and varies from about 6.5 to about 35 and "z" is the mole ratio of O to (Al+E) and has a value determined by the equation:

$$z=(m \cdot n + r \cdot p + 3 + 4 \cdot y)/2.$$

Applicants have now modified these UZM-8 materials in order to change some of their properties. By using one or more techniques selected from acid extraction, calcination, steaming and ammonium hexafluorosilicate treatment, applicants have been able to control the aluminum content of the UZM-8 zeolites to nearly all silica while maintaining their structure and porosity. Dealumination strategies are known in the art and are given by Breck (see D. W. Breck, *Zeolite Molecular Sieves*, Wiley and Sons, New York, (1974), p. 441) and Skeels and Breck (see U.S. Pat. No. 4,610,856). The result is a modified UZM-8 (UZM-8HS) material containing less aluminum than the starting UZM-8 composition. Control of the Al content in the zeolite allows one to tune the properties associated with the Al, such as ion-exchange capacity and acidity thereby providing improved catalysts and/or adsorbents. This new family of materials is designated UZM-8HS.

SUMMARY OF THE INVENTION

As stated, the present invention relates to crystalline microporous aluminosilicate zeolites designated UZM-8HS which are derived from UZM-8 zeolites. Accordingly, one embodiment of the invention is a microporous crystalline zeolite having a three-dimensional framework of at least $AlO_2$ and $SiO_2$ tetrahedral units and an empirical composition on an anhydrous basis in terms of mole ratios of the elements of:

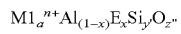

where M1 is at least one exchangeable cation selected from the group consisting of alkali metals, alkaline earth metals, rare earth metals, ammonium ion, hydrogen ion and mixtures thereof, a is the mole ratio of M1 to (Al+E) and varies from about 0.05 to about 50, E is an element selected from the group consisting of gallium, iron, boron, chromium, indium and mixtures thereof, x is the mole fraction of E and varies from 0 to about 1.0, n is the weighted average valence of M1 and has a value of about +1 to about +3, y' is the mole ratio of Si to (Al+E) and is greater than about 6.5 and z" is the mole ratio of O to (Al+E) and has a value determined by the equation:

$$z''=(a \cdot n + 3 + 4 \cdot y')/2$$

the zeolite characterized in that it has an x-ray diffraction pattern having at least the d-spacings and relative intensities shown in Table B.

TABLE B

| UZM-8HS | | |
|---|---|---|
| 2-θ | d(Å) | I/I$_o$ % |
| 6.90-7.40 | 12.8-11.94 | w-vs |
| 8.15-8.66 | 10.84-10.21 | m-vs |
| 14.10-14.70 | 6.28-6.02 | w-vs |
| 19.40-20.10 | 4.57-4.41 | w-s |
| 22.00-22.85 | 4.04-3.89 | m-vs |
| 24.65-25.40 | 3.61-3.50 | w-m |
| 25.70-26.50 | 3.46-3.36 | w-vs |

Another embodiment of the invention is a process for preparing a modified microporous crystalline zeolite having a three-dimensional framework of at least $AlO_2$ and $SiO_2$ tetrahedral units and an empirical composition on an anhydrous basis in terms of mole ratios of the elements of:

$$M1_a^{n+}Al_{(1-x)}E_xSi_yO_{z''}$$

where M1 is at least one exchangeable cation selected from the group consisting of alkali metals, alkaline earth metals, rare earth metals, ammonium ion, hydrogen ion and mixtures thereof, a is the mole ratio of M1 to (Al+E) and varies from about 0.05 to about 50, E is an element selected from the group consisting of gallium, iron, boron, chromium, indium and mixtures thereof, x is the mole fraction of E and varies from 0 to about 1.0, n is the weighted average valence of M1 and has a value of about +1 to about +3, y' is the mole ratio of Si to (Al+E) and is greater than about 6.5 and z" is the mole ratio of O to (Al+E) and has a value determined by the equation:

$$z''=(a \cdot n+3+4 \cdot y')/2$$

the zeolite characterized in that it has the x-ray diffraction pattern having at least the d-spacings and relative intensities of Table B, the process comprising treating a starting zeolite at treating conditions thereby removing at least a portion of the framework aluminum and optionally inserting silicon into the framework to provide the modified zeolite; the starting zeolite having an empirical formula on an anhydrous basis of:

$$M'^{n+}_m R_{r'}^{p+} Al_{(1-x)}E_xSi_yO_z$$

where M' is an exchangeable cation selected from the group consisting of ammonium ion, hydrogen ion, alkali metals, alkaline earth metals, rare earth metals and mixtures thereof, n is the weighted average valence of M' and varies from +1 to about +3, m' is the mole ratio of M' to (Al+E) and varies from 0 to about 7.0, R is at least one organoammonium cation selected from the group consisting of quaternary ammonium cations, diquaternary ammonium cations, protonated amines, protonated diamines, protonated alkanolamines and quaternized alkanolammonium cations, p is the average weighted valence of the organic cation and varies from about +1 to about +2, r' is the mole ratio of R to (Al+E) and varies from 0 to about 5.0, r'+m'>0, y is the ratio of Si to (Al+E) and varies from about 6.5 to about 35 and z' is the mole ratio of O to (Al+E) and has a value given by the equation:

$$z'=(m' \cdot n+r' \cdot p+3+4 \cdot y)/2.$$

Among the treating steps which can be used are: treatment with a fluorosilicate solution or slurry whereby framework aluminum atoms of the starting zeolite are removed and replaced by extraneous silicon atoms; extraction with a weak, strong, or complexing acid and calcination or steaming followed by ion-exchange or acid extraction.

These and other objects and embodiments will become more apparent after a detailed description of the invention.

DETAILED DESCRIPTION OF THE INVENTION

The aluminosilicate zeolites (UZM-8HS) of the invention and substituted versions of the same have a unique structure related to UZM-8. UZM-8HS is obtained by treating a starting zeolite having the topology of UZM-8 with: a) a fluorosilicate solution or slurry; b) calcination or steaming followed by acid extraction or ion-exchange; c) acid extraction or d) any combination of these processes in any order. UZM-8 is described in U.S. Pat. No. 6,756,030 B1, the contents of which are incorporated in their entirety by reference. As described in the '030 patent, UZM-8 has a composition in the as-synthesized form on an anhydrous basis expressed by the empirical formula:

$$M_m^{n+}R_r^{p+}Al_{(1-x)}E_xSi_yO_z \qquad (1)$$

where M is at least one exchangeable cation and is selected from the group consisting of alkali and alkaline earth metals. Specific examples of the M cations include but are not limited to lithium, sodium, potassium, cesium, strontium, calcium, magnesium, barium and mixtures thereof. The value of m which is the mole ratio of M to (Al+E) varies from 0 to about 2. R is at least one organoammonium cation selected from the group consisting of protonated amines, protonated diamines, protonated alkanolamines, quaternary ammonium ions, diquaternary ammonium ions, quaternized alkanolammonium ions. Preferred organoammonium cations are those that are non-cyclic or those that do not contain a cyclic group as one substituent. Of these, those that contain at least two methyl groups as substituents are especially preferred. Examples of preferred cations include but are not limited to DEDMA, ETMA and HM. The value of r which is the mole ratio of R to (Al+E) varies from about 0.05 to about 5.0. The value of n, which is the weighted average valence of M, varies from +1 to about +2. The value of p, which is the average weighted valence of the organic cation has a value from about +1 to about +2. E is an element which is tetrahedrally coordinated, is present in the framework and is selected from the group consisting of gallium, iron, boron, chromium, indium, and mixtures thereof. The value of x which is the mole fraction of E varies from 0 to about 1.0. The ratio of Si to (Al+E) is represented by y which varies from about 6.5 to about 35, while the mole ratio of O to (Al+E) is represented by z and has a value given by the equation:

$$z=(m \cdot n+r \cdot p+3+4 \cdot y)/2.$$

When M is only one metal, then the weighted average valence is the valence of that one metal, i.e. +1 or +2. However, when more than one M metal is present, the total amount of $$M_m^{n+}=M_{m1}^{(n1)+}30\ M_{m2}^{(n2)+}+M_{m3}^{(n3)+}+$$

and the weighted average valence n is given by the equation:

$$n = \frac{m_1 \cdot n_1 + m_2 \cdot n_2 + m_3 \cdot n_3 + \cdots}{m_1 + m_2 + m_3 \cdots}$$

Similarly when only one R organic cation is present, the weighted average valence is the valence of the single R cation, i.e., +1 or +2. When more than one R cation is present, the total amount of R is given by the equation.

$$R_r^{p+}=R_{r1}^{(p1)+}+R_{r2}^{(p2)+}+R_{r3}^{(p3)+}$$

and the weighted average valence p is given by the equation $$p = \frac{p_1 \cdot r_1 + p_2 \cdot r_2 + p_3 \cdot r_3 + \cdots}{r_1 + r_2 + r_3 + \cdots}$$

These aluminosilicate zeolites (UZM-8) are prepared by a hydrothermal crystallization of a reaction mixture prepared by combining reactive sources of M, R, aluminum, and silicon in aqueous media. Often these reaction mixtures are homogenous solutions and may be alkali free. Accordingly, the aluminum sources include, but are not limited to, aluminum alkoxides, precipitated alumina, aluminum hydroxide, aluminum salts and aluminum metal. Specific examples of aluminum alkoxides include, but are not limited to aluminum sec-butoxide, and aluminum isopropoxide. Sources of silica include but are not limited to tetraethylorthosilicate, fumed silicas, precipitated silicas and colloidal silica. Sources of the M metals include the halide salts, nitrate salts, acetate salts, and hydroxides of the respective alkali or alkaline earth metals. R can be introduced as an organoammonium cation or as an amine. In the case where R is a quaternary ammonium cation or a quaternized alkanolammonium cation, the sources include but are not limited to the hydroxide, chloride, bromide, iodide and fluoride compounds. Specific examples include without limitation diethyldimethylammonium (DEDMA) hydroxide, ethyltrimethylammonium (ETMA) hydroxide, tetramethylammonium hydroxide, tetraethylammonium hydroxide, hexamethonium bromide, tetramethylammonium chloride, methyltriethylammonium hydroxide and tetramethylammonium carbonate. R may also be introduced as a neutral amine, diamine, and alkanolamine which hydrolyzes to give an organoammonium cation. Specific examples are triethanolamine, triethylamine, and N,N,N',N' tetramethyl-1,6-hexanediamine. Any mixtures of the above mentioned forms of R may also be employed. Preferred sources of R include without limitation ETMAOH, DEDMAOH and HM(OH)$_2$.

The reaction mixture containing reactive sources of the desired components can be described in terms of molar ratios of the oxides by the formula:

$$aM_{2/n}O:bR_{2/n}O:(1-c)Al_2O_3:cE_2O_3:dSiO_2:eH_2O$$

where a is the mole ratio of the oxide of M and has a value of 0 to about 25, b is the mole ratio of the oxide of R and has a value of about 1.5 to about 80, d is the mole ratio of silica and has a value of about 10 to about 100, c is the mole fraction of the oxide of E and has a value from 0 to about 1.0, and e is the mole ratio of water and has a value of about 100 to about 15000. The reaction mixture is now reacted at a temperature of about 85° C. to about 225° C. and preferably from about 120° C. to about 150° C. for a period of about 1 day to about 28 days and preferably for a time of about 5 days to about 14 days in a sealed reaction vessel under autogenous pressure. After crystallization is complete, the solid product is isolated from the heterogeneous mixture by means such as filtration or centrifugation, and then washed with de-ionized water and dried in air at ambient temperature up to about 100° C.

UZM-8 can be identified by its x-ray diffraction pattern having at least the d-spacing and relative intensities set forth in Table A.

TABLE A

| UZM-8 | | |
|---|---|---|
| 2-θ | d(Å) | I/I$_o$ % |
| 6.40-6.90 | 13.80-12.80 | w-s |
| 6.95-7.42 | 12.70-11.90 | m-s |
| 8.33-9.11 | 10.60-9.70 | w-vs |
| 19.62-20.49 | 4.52-4.33 | m-vs |
| 21.93-22.84 | 4.05-3.89 | m-vs |
| 24.71-25.35 | 3.60-3.51 | w-m |
| 25.73-26.35 | 3.46-3.38 | m-vs |

The cation population of the starting UZM-8 is not a critical factor of the instant process insofar as the dealumination processes are concerned, but can have a bearing on the final result, especially with regard to the extent of dealumination.

Thus, the UZM-8 can be used as synthesized or can be ion exchanged to provide a different cation form. In this respect, the starting zeolite can be described by the empirical formula:

$$M'_{m'}{}^{n'+}R_{r'}{}^{p+}Al_{(1-x)}E_xSi_yO_{z'} \qquad (2)$$

where R, x, y, and E are as described above and m' has a value from 0 to about 7.0, M' is a cation selected from the group consisting of alkali metals, alkaline earth metals, rare earth metals, hydrogen ion, ammonium ion, and mixtures thereof, n' is the weighted average valence of M' and varies from about 1 to about 3, r' has a value from 0 to about 7.0, r'+m'>0, and p is the weighted average valence of R and varies from about +1 to +2. The value of z' is given by the formula:

$$z'=(m'\cdot n'+r'\cdot p+3+4\cdot y)/2.$$

The designation UZM-8 will be used to refer to the zeolite represented by formula (2) which includes both the as-synthesized and ion exchanged forms of the zeolite.

Methods used to exchange one cation for another are well known in the art and involve contacting the microporous compositions with a solution containing the desired cation (at molar excess) at exchange conditions. Exchange conditions include a temperature of about 15° C. to about 100° C. and a time of about 20 minutes to about 50 hours. The organic cation can also be removed prior to ion exchange by heating under controlled conditions. A special case of ion-exchange is ammonia calcination, in which the organic template can be decomposed and replaced by ammonium cation.

In a preferred case, especially for dealumination by treatment with a fluorosilicate solution, the UZM-8 is exchanged with ammonium cation by contacting it with ammonium nitrate at a temperature of 15° C. to about 100° C., followed by a water wash. This procedure may be repeated several times. Finally, the exchanged UZM-8 zeolite is dried at 100° C.

One process of preparing the UZM-8HS of the present invention is by treating the UZM-8 composition described above with a fluorosilicate salt at a temperature of about 20° C. to about 90° C. The fluorosilicate salt serves two purposes. It removes aluminum atoms from the framework and provides a source of extraneous silicon, which can be inserted into the framework (replacing the aluminum). The fluorosilicate salts which can be used are described by the general formula:

$$A_{2/n}SiF_6$$

where n is the valence of A and A is a cation selected from the group consisting of $NH_4^+$, $H^+$, $Mg^{2+}$, $Li^+$, $Na^+$, $Ba^{2+}$, $Cd^{2+}$, $Cu^+$, $Cu^{2+}$, $Ca^{2+}$, $Cs^+$, $Fe^{2+}$, $Ca^{2+}$, $Pb^{2+}$, $Mn^{2+}$, $Rb^+$, $Ag^+$, $Sr^{2+}$, $Tl^+$, and $Zn^{2+}$. The ammonium fluorosilicate is most preferred because of its substantial solubility in water and because it forms water soluble by-product salts upon reaction with the zeolite, namely $(NH_4)_3AlF_6$.

The fluorosilicate salt is contacted with the UZM-8 zeolite in the form of an aqueous solution or slurry at a pH in the range of about 3 to about 7. This solution is contacted with the zeolite either incrementally or continuously at a slow rate such that a sufficient proportion of the framework aluminum atoms removed are replaced by silicon atoms to retain at least 50%, preferably at least 70% of the framework (crystalline) structure of the starting UZM-8 zeolite. The amount of fluorosilicate necessary to carry out the process of this invention can vary considerably, but should be at least in an amount of 0.0075 moles of the fluorosilicate salt per 100 grams of starting zeolite. Once the reaction is complete, the product zeolite UZM-8HS is isolated by conventional techniques such as filtration.

Without wishing to be bound by any particular theory, the process of removing aluminum and inserting the silicon appears to proceed in two steps in which the aluminum extraction step will, unless controlled, proceed very rapidly while the silicon insertion is relatively slow. If dealumination becomes too extensive without silicon substitution, the crystal structure becomes seriously degraded and ultimately collapses. In general, the rate of aluminum extraction is decreased as the pH of the fluorosilicate solution in contact with the zeolite is increased within the range of about 3 to about 7 and as the concentration of the fluorosilicate in the reaction system is decreased. At pH values below 3, crystal degradation can be unduly severe, whereas at pH values higher than 7, silicon insertion is unduly slow. Also, increasing the reaction temperature tends to increase the rate of substitution of silicon. Increasing the reaction temperature has been found to have less of an effect on dealumination than the pH of the solution. Therefore, the pH may be considered a means of controlling the dealumination while temperature may be considered as a means of controlling the substitution rate.

Theoretically, there is no lower limit for the concentration of fluorosilicate salt in the aqueous solution employed, provided, of course, the pH of the solution is high enough to avoid undue destructive attack on the UZM-8 zeolite structure apart from the intended reaction with the fluorosilicate. A slow rate of addition of fluorosilicate salts insures that adequate time is permitted for the insertion of silicon into the framework before excessive aluminum extraction occurs with consequent collapse of the crystal structure. In general the effective reaction temperature is between about 10° C. and 99° C., preferably between about 20° C. and 95° C., but temperatures of 125° C. or higher and as low as 0° C. can be used.

The maximum concentration of fluorosilicate salt in the aqueous solution employed is, of course, interrelated to the temperature and pH factors and also with the time of contact between the zeolite and the solution and the relative proportions of zeolite and fluorosilicate salt. Solutions having fluorosilicate salt concentrations of between $10^{-3}$ moles per liter of solution and up to saturation of the solution can be employed, but it is preferred that concentrations in the range of between about 0.05 and about 2.0 moles per liter of solution be used. In addition, as hereinbefore discussed, slurries of the fluorosilicate salts may be employed. The aforementioned concentration values are with respect to true solutions, and are not intended to apply to the total fluorosilicate salts in slurries of the salts in water. Even very slightly soluble fluorosilicate salts can be slurried in water and used as a reagent, the undissolved solids being readily available to replace dissolved molecular species consumed in reaction with the zeolite. The minimum value for the amount of fluoro salt to be added is preferably at least equivalent to the minimum mole fraction of aluminum to be removed from the zeolite.

It has been found that when large amounts of silicon atoms are to be substituted, i.e., increasing the $SiO_2/Al_2O_3$ ratio by more than 100%, it is preferable to carry out the process in multiple steps in order to minimize crystal degradation. As the amount of silicon that is substituted into the framework is substantially increased (beyond 100% increase) it may actually be necessary to carry out the process in two or more steps in order to prevent excessive degradation of the crystalline structure. That is, contacting with the fluorosilicate salt is carried out in two or more steps using a lower concentration of the fluorosilicate salt than required to replace the desired amount of silicon in one step. After each fluorosilicate treatment, the product is washed to remove fluoride and aluminum. Drying of the zeolite at 50° C. between treatments may also be done to facilitate the handling of the wet zeolite product.

Another embodiment of the invention involves contacting the UZM-8 starting zeolite with an acid (acid extraction) in order to remove some of the aluminum from the framework and thereby provide the UZM-8HS zeolite of the invention. Although it is known that aluminum can be extracted from the framework by acids, it is not predictable whether the resulting product will retain a substantial portion of its crystallinity or whether the structure will collapse resulting in an amorphous material. Applicants have discovered that UZM-8 can be dealuminated to nearly pure silica forms while maintaining substantial crystallinity, surface area and micropore volume.

The acids which can be used in carrying out acid extraction include without limitation mineral acids, carboxylic acids and mixtures thereof. Examples of these include sulfuric acid, nitric acid, ethylene diaminetetraacetic acid (EDTA), citric acid, oxalic acid, etc. The concentration of acid which can be used is not critical but is conveniently between about 1 wt. % to about 80 wt. % acid and preferably between 5 wt. % and 40 wt. % acid. Acid extraction conditions include a temperature of about 10° C. to about 100° C. for a time of about 10 minutes to about 24 hours. Once treated with the acid, the UZM-8HS zeolite is isolated by means such as filtration, washed with deionized water and dried at ambient temperature up to about 100° C.

The extent of dealumination obtained from acid extraction depends on the cation form of the starting UZM-8 as well as the acid concentration and the time and temperature over which the extraction is conducted. For example, if organic cations are present in the starting UZM-8, the extent of dealumination will be slight compared to a UZM-8 in which the organic cations have been removed. This may be preferred if it is desired to have dealumination just at the surface of the UZM-8. Convenient ways of removing the organic cations include calcination, ammonia calcination, steaming and ion exchange. Calcination conditions include a temperature of about 300° C. to about 600° C. for a time of about 2 to about 24 hours. Steaming conditions include a temperature of about 400° C. to about 850° C. with from about 1% to about 100% steam for a time of about 10 minutes to about 48 hours and preferably a temperature of about 500° C. to about 600° C., steam concentration of about 5 to about 50% and a time of about 1 to about 2 hours. Ion exchange conditions are as set forth above.

A special treatment for removing organic cations to obtain the ammonium ion exchanged form is ammonia calcination. Calcination in an ammonia atmosphere can decompose organic cations, presumably to a proton form that can be neutralized by ammonia to form the ammonium cation. The stability of the ammonium form of the zeolite prevents dealumination upon hydration, which occurs extensively in lower ratio zeolites in the proton forms obtained in air calcinations. The resulting ammonium form of the zeolite can be further ion-exchanged to any other desired form. Ammonia calcination conditions include treatment in the ammonia atmosphere at temperatures between about 250° C. and about 600° C. and more preferably between about 250° C. and about 450° C. for times of 10 minutes to 5 hours. Optionally, the treatments can be carried out in multiple steps within this temperature range such that the total time in the ammonia atmosphere does not exceed 5 hours. Above 500° C., the treatments should be brief, less than a half hour and more preferably on the order of 5-10 minutes. Extended calcination times above 500° C. can lead to unintended dealumination along with the desired ammonium ion-exchange and are unnecessarily harsh as most organoammonium templates easily decompose at lower temperatures.

It should be pointed out that both calcination and steaming treatments not only remove organic cations, but can also dealuminate the zeolite. Thus, alternate embodiments of the invention include: a calcination treatment followed by acid extraction and steaming followed by acid extraction. A further embodiment of the invention comprises calcining or steaming the starting UZM-8 zeolite followed by an ion-exchange treatment. Of course an acid extraction can be carried out concurrently with, before or after the ion exchange.

The ion exchange conditions are the same as set forth above, namely a temperature of about 15° C. to about 100° C. and a time of about 20 minutes to about 50 hours. Ion exchange can be carried out with a solution comprising a cation (M1') selected from the group consisting of alkali metals, alkaline earth metals, rare earth metals, hydrogen ion, ammonium ion, and mixtures thereof. By carrying out this ion exchange, the M1 cation is exchanged for a secondary or different M1' cation. In a preferred embodiment, the UZM-8HS composition after the steaming or calcining steps is contacted with an ion exchange solution comprising an ammonium salt. Examples of ammonium salts include but are not limited to ammonium nitrate, ammonium chloride, ammonium bromide, and ammonium acetate. The ammonium ion containing solution can optionally contain a mineral acid such as but not limited to nitric, hydrochloric, sulfuric and mixtures thereof. The concentration of the mineral acid is that amount necessary to give a ratio of $H^+$ to $NH_4^+$ of 0 to 1. This ammonium ion exchange aids in removing any debris present in the pores after the steaming and/or calcination treatments.

It is apparent from the foregoing that, with respect to effective process conditions, it is desirable that the integrity of the zeolite crystal structure be substantially maintained throughout the dealumination process, and that the zeolite retains at least 50%, preferably at least 70 and more preferably at least 90% of its original crystallinity. A convenient technique for assessing the crystallinity of the products relative to the crystallinity of the starting material is the comparison of the relative intensities of the d-spacing of their respective X-ray powder diffraction patterns. The sum of the peak intensities, in arbitrary units above the background, of the starting material is used as the standard and is compared with the corresponding peak intensities of the products. When, for example, the numerical sum of the peak heights of the molecular sieve product is 85 percent of the value of the sum of the peak intensities of the starting zeolite, then 85 percent of the crystallinity has been retained. In practice it is common to utilize only a portion of the peaks for this purpose, as for example, five or six of the strongest peaks. Other indications of the retention of crystallinity are surface area and adsorption capacity. These tests may be preferred when the substituted metal significantly changes, e.g., increases, the absorption of x-rays by the sample or when peaks experience substantial shifts such as in the dealumination process.

After having undergone any of the dealumination treatments as described above, the UZM-8HS is usually dried and can be used in various processes as discussed below. Applicants have found that the properties of the UZM-8HS can be further modified by one or more additional treatment. These treatments include steaming, calcining or ion exchanging and can be carried out individually or in any combination. Some of these combinations include but are not limited to:

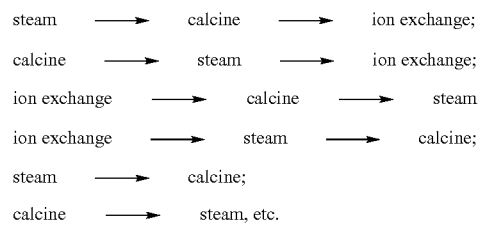

The dealumination treatment described above can be combined in any order to provide the zeolites of the invention although not necessarily with equivalent result. It should be pointed out that the particular sequence of treatments, e.g., AFS, acid extraction, steaming, calcining, etc can be repeated as many times as necessary to obtain the desired properties. Of course one treatment can be repeated while not repeating other treatments, e.g., repeating the AFS two or more times before carrying out steaming or calcining; etc. Finally, the sequence and/or repetition of treatments will determine the properties of the final UZM-8HS composition.

The UZM-8HS as prepared above is described by the empirical formula on an anhydrous basis of:

$$M1_a^{n+}Al_{(1-x)}E_xSi_{y'}O_{z''}$$

where M1 is at least one exchangeable cation selected from the group consisting of alkali, alkaline earth metals, rare earth metals, ammonium ion, hydrogen ion and mixtures thereof, a is the mole ratio of M1 to (Al+E) and varies from about 0.05 to about 50, n is the weighted average valence of M1 and has a value of about +1 to about +3, E is an element selected from the group consisting of gallium, iron, boron, chromium, indium and mixtures thereof, x is the mole fraction of E and varies from 0 to 1.0, y' is the mole ratio of Si to (Al+E) and varies from greater than about 6.5 to virtually pure silica and z'' is the mole ratio of O to (Al+E) and has a value determined by the equation:

$$z''=(a \cdot n+3+4 \cdot y')/2$$

By virtually pure silica is meant that virtually all the aluminum and/or the E metals have been removed from the framework. It is well know that it is virtually impossible to remove all the aluminum and/or E metal. Numerically, a zeolite is virtually pure silica when y' has a value of at least 3,000, preferably 10,000 and most preferably 20,000. Thus, ranges for y' are from 6.5 to 3,000 preferably greater than 10 to about 3,000; 6.5 to 10,000 preferably greater than 10 to about 10,000 and 6.5 to 20,000 preferably greater than 10 to about 20,000.

In specifying the proportions of the zeolite starting material or adsorption properties of the zeolite product and the like herein, the "anhydrous state" of the zeolite will be intended unless otherwise stated. The term "anhydrous state" is employed herein to refer to a zeolite substantially devoid of both physically adsorbed and chemically adsorbed water.

The UZM-8HS zeolite obtained after one or more of the above described treatments will have x-ray diffraction patterns which are different (and thus unique) from that of UZM-8. A list of the major peaks that are common to all the UZM-8HS materials is given in Table B.

TABLE B

| UZM-8HS | | |
|---|---|---|
| 2-θ | d(Å) | I/I$_o$ % |
| 6.90-7.40 | 12.80-11.94 | w-vs |
| 8.15-8.66 | 10.84-10.21 | m-vs |
| 14.10-14.70 | 6.28-6.02 | w-vs |
| 19.40-20.10 | 4.57-4.41 | w-s |
| 22.00-22.85 | 4.04-3.89 | m-vs |
| 24.65-25.40 | 3.61-3.50 | w-m |
| 25.70-26.50 | 3.46-3.36 | w-vs |

The zeolites of this invention are capable of separating mixtures of molecular species based on the molecular size (kinetic diameter) or on the degree of polarity of the molecular species. When the separation of molecular species is based on molecular size, separation is accomplished by the smaller molecular species entering the intracrystalline void space while excluding larger species. The kinetic diameters of various molecules such as oxygen, nitrogen, carbon dioxide, carbon monoxide and various hydrocarbons are provided in D. W. Breck, *Zeolite Molecular Sieves*, John Wiley and Sons (1974) p. 636. The separation of hydrocarbons based on molecular size is a preferred application.

The crystalline microporous compositions of the present invention either as synthesized or after calcination can be used as catalysts or catalyst supports in hydrocarbon conversion processes. Hydrocarbon conversion processes are well known in the art and include cracking, hydrocracking, alkylation of both aromatics and isoparaffins, isomerization, polymerization, reforming, dewaxing, hydrogenation, dehydrogenation, transalkylation, dealkylation, hydration, dehydration, hydrotreating, hydrodenitrogenation, hydrodesulfurization, methanation and syngas shift process. Specific reaction conditions and the types of feeds which can be used in these processes are set forth in U.S. Pat. Nos. 4,310,440 and 4,440,871 which are incorporated by reference. Preferred hydrocarbon conversion processes are alkylation of aromatics, isomerization of xylenes, naphtha cracking, ring-opening and conversion of oxygenates to olefins.

Other reactions may be catalyzed by these crystalline microporous compositions, including base-catalyzed side chain alkylation of alkylaromatics, aldol-condensations, olefin double bond isomerization and isomerization of acetylenes, alcohol dehydrogenation, and olefin dimerization and oligomerization. Some of the reaction conditions and types of feeds that can be used in these processes are set forth in U.S. Pat. No. 5,015,796 and in H. Pines, THE CHEMISTRY OF CATALYTIC HYDROCARBON CONVERSIONS, Academic Press (1981) pp. 123-154 and references contained therein, which are incorporated by reference.

The X-ray patterns presented in the following examples (and tables above) were obtained using standard X-ray powder diffraction techniques. The radiation source was a high-intensity X-ray tube operated at 45 kV and 35 ma. The diffraction pattern from the copper K-alpha radiation was obtained by appropriate computer based techniques. Flat compressed powder samples were continuously scanned at 2° (2θ) per minute from 2° to 70° (2θ). Interplanar spacings (d) in Angstrom units were obtained from the position of the diffraction peaks expressed as 2θ where θ is the Bragg angle as observed from digitized data. Intensities were determined from the integrated area of diffraction peaks after subtracting background, "I$_o$" being the intensity of the strongest line or peak, and "I" being the intensity of each of the other peaks.

As will be understood by those skilled in the art, the determination of the parameter 2θ is subject to both human and mechanical error, which in combination can impose an uncertainty of about ±0.4 on each reported value of 2θ and up to ±0.5 on reported values for nanocrystalline materials. This uncertainty is, of course, also manifested in the reported values of the d-spacing, which are calculated from the θ values. This imprecision is general throughout the art and is not sufficient to preclude the differentiation of the present crystalline materials from each other and from the compositions of the prior art. In some of the X-ray patterns reported, the relative intensities of the d-spacing are indicated by the notations vs, s, m and w which represent very strong, strong, medium, and weak, respectively. In terms of 100 X I/I$_o$, the above designations are defined as w=0-15; m=15-60; s=60-80 and vs=80-100.

In certain instances the purity of a synthesized product may be assessed with reference to its X-ray powder diffraction pattern. Thus, for example, if a sample is stated to be pure, it is intended only that the X-ray pattern of the sample is free of lines attributable to crystalline impurities, not that there are no amorphous materials present.

In order to more fully illustrate the invention, the following examples are set forth. It is to be understood that the examples are only by way of illustration and are not intended as an undue limitation on the broad scope of the invention as set forth in the appended claims.

EXAMPLE 1

An aluminosilicate reaction mixture was prepared by adding 80.44 g of Al(Osec-Bu)$_3$ (95+%) to 732.97 g of DEDMAOH (20%) with vigorous stirring. This was followed by the addition of 252.7 g of Ultrasil VN SP (85%) silica. Then a solution containing 12.67 g NaOH dissolved in 321.22 g distilled water was prepared and added slowly to the aluminosilicate reaction mixture with continued vigorous stirring. The mixture was homogenized for 30 minutes with a high-speed stirrer. After a half-hour of homogenizing the reaction mixture, 16 g of UZM-8 seeds were added. The reaction mixture was placed in a 2 L stirred autoclave at 150° C. for 185 hours. The solid product was isolated by filtration, washed with de-ionized water, and dried at room temperature.

X-ray powder diffraction analysis showed the product to have the UZM-8 structure. Characteristic diffraction lines for the product are shown in Table 1 below. The UZM-8 sample was ammonium ion-exchanged with a solution that contained 1 g NH$_4$NO$_3$ dissolved in 10 g de-ionized water for every gram of UZM-8. The exchanges were carried out twice, heating for 2 hr at 80° C. each time, with thorough washes in between. A portion of the exchanged product was calcined under a flow of nitrogen for 6 hr at 540° C. The composition of the calcined product exhibited the elemental mole ratio Si/Al=9.47 as determined by elemental analysis. The BET surface area of the calcined material was 427 m$^2$/g and the micropore volume was 0.11 cc/g.

TABLE 1

| 2-θ | d(Å) | I/I$_o$ % |
|---|---|---|
| 2.88 | 30.61 | m |
| 6.56 | 13.46 | m |
| 7.12 | 12.40 | s |
| 8.52 | 10.37 | vs |
| 12.78 | 6.92 | w |
| 13.36 | 6.62 | w |
| 14.39 | 6.15 | w |

TABLE 1-continued

| 2-θ | d(Å) | I/I$_o$% |
|---|---|---|
| 19.80 | 4.48 | m |
| 22.16 | 4.01 | s |
| 24.90 | 3.57 | m |
| 25.90 | 3.44 | vs |
| 26.36 | 3.38 | m |
| 33.25 | 2.69 | w |
| 37.64 | 2.39 | w |
| 45.87 | 1.98 | w |
| 48.60 | 1.87 | w |
| 51.53 | 1.77 | w |
| 65.24 | 1.43 | w |

EXAMPLE 2

A 23 g portion of the UZM-8 ammonium exchanged composition from example 1 was acid treated as follows. An acidic solution was prepared by diluting 50 g HNO$_3$ (69%) in 88 g de-ionized water. The solution was heated to 98° C. before the addition of the ammonium exchanged UZM-8. The resulting slurry was stirred for 4 hr at 98° C. The product was isolated by filtration, washed with de-ionized water, and dried at 98° C.

The modified product was determined to be UZM-8HS via x-ray powder diffraction analysis. Characteristic diffraction lines for the product are listed in Table 2. Elemental analyses showed the product to have a Si/Al ratio of 22.2. The sample was calcined at 540° C. under nitrogen for 6 hrs. The BET surface area of acid extracted UZM-8 was 515 m$^2$/g with a micropore volume of 0.14 cc/g.

TABLE 2

| 2-θ | d(Å) | I/I$_o$% |
|---|---|---|
| 4.71 | 18.76 | w |
| 7.21 | 12.25 | s |
| 8.58 | 10.30 | vs |
| 14.50 | 6.10 | m |
| 19.88 | 4.46 | m |
| 22.50 | 3.95 | vs |
| 25.15 | 3.54 | m |
| 26.10 | 3.41 | s |
| 26.82 | 3.32 | m |
| 33.54 | 2.67 | w |
| 46.32 | 1.96 | w |
| 48.94 | 1.86 | w |
| 52.12 | 1.75 | w |
| 65.73 | 1.42 | w |

EXAMPLE 3

A 115 g portion of the UZM-8 ammonium exchanged from example 1 was treated by acid extraction. A solution was prepared by diluting 200 g HNO$_3$ (69%) in 500 g de-ionized water. The solution was heated to 98° C. before the addition of the ammonium exchanged UZM-8. The resulting slurry was stirred for 18 hr at 98° C. The product was isolated by filtration, washed with de-ionized water, and dried at room temperature.

The product was identified as UZM-8HS via x-ray powder diffraction analysis. Characteristic diffraction lines for the product are listed in Table 3. Elemental analyses showed the product to have a Si/Al ratio of 20.96. A portion of this sample (26 g) was calcined by ramping at 1° C./min to 560° C. under a N$_2$ atmosphere and held there for 10 hr. The BET surface area of this acid extracted UZM-8HS was 504 m$^2$/g with a micropore volume of 0.14 cc/g.

TABLE 3

| 2-θ | d(Å) | I/I$_o$% |
|---|---|---|
| 5.14 | 17.19 | w |
| 7.10 | 12.44 | s |
| 8.40 | 10.52 | s |
| 14.34 | 6.17 | m |
| 19.62 | 4.52 | m |
| 22.45 | 3.96 | vs |
| 24.98 | 3.56 | w |
| 25.96 | 3.43 | s |
| 33.17 | 2.70 | w |
| 46.22 | 1.96 | w |
| 52.10 | 1.75 | w |
| 65.25 | 1.43 | w |

EXAMPLE 4

A 14 g sample of the acid extracted and calcined UZM-8HS sample (Si/Al=20.96) from Example 3 was acid extracted a second time. An acidic solution was prepared by diluting 70 g HNO$_3$ (69%) in 150 g de-ionized water. The solution was heated to 98° C. before adding the acid extracted UZM-8HS. The slurry was stirred for 7 hr at 98° C. The product was isolated by filtration, washed with de-ionized water, and dried at room temperature.

The product had the UZM-8HS structure as indicated by x-ray powder diffraction analysis. Characteristic lines in the diffraction pattern are given in Table 4. Elemental analyses showed the Si/Al ratio to be 40.58, while N$_2$ adsorption measurements gave a BET surface area of 495 m$^2$/g with a micropore volume of 0.13 cc/g.

TABLE 4

| 2-θ | d(Å) | I/I$_o$% |
|---|---|---|
| 4.40 | 20.05 | m |
| 6.59 | 13.40 | w |
| 7.12 | 12.41 | m |
| 8.46 | 10.45 | s |
| 12.70 | 6.96 | w |
| 14.42 | 6.14 | vs |
| 19.72 | 4.50 | w |
| 22.46 | 3.96 | vs |
| 25.15 | 3.54 | w |
| 26.04 | 3.42 | s |
| 26.92 | 3.31 | m |
| 33.36 | 2.68 | w |
| 37.96 | 2.37 | w |
| 46.63 | 1.95 | w |
| 65.60 | 1.42 | w |

EXAMPLE 5

A 7 g portion of the double acid extracted UZM-8HS from Example 4 was further treated with acid. An acidic solution was prepared by diluting 16 g HNO$_3$ (69%) in 161 g de-ionized water. The solution was heated to 98° C. before adding the double acid extracted UZM-8 from Example 4. The slurry was stirred for 19 hr at 98° C. The product was isolated by filtration, washed with de-ionized water, and dried at room temperature.

The product was identified as UZM-8HS via powder x-ray diffraction analysis. Characteristic diffraction lines for the product are given in Table 5. Elemental analyses showed the Si/Al ratio to be 44.51, while $N_2$ adsorption measurements gave a BET surface area of 517 m²/g and a micropore volume of 0.13 cc/g.

TABLE 5

| 2-θ | d(Å) | I/I$_o$ % |
|---|---|---|
| 4.52 | 19.56 | vs |
| 7.14 | 12.36 | m |
| 8.46 | 10.44 | m |
| 12.74 | 6.94 | w |
| 14.50 | 6.10 | vs |
| 19.86 | 4.47 | w |
| 22.50 | 3.95 | vs |
| 25.13 | 3.54 | w |
| 26.08 | 3.41 | s |
| 29.30 | 3.05 | w |
| 32.97 | 2.71 | w |
| 52.24 | 1.75 | w |
| 65.69 | 1.42 | w |

EXAMPLE 6

A 28 g portion of a UZM-8 sample (Si/Al=9.47) was calcined by ramping at 3° C./min to 560° C. under an $N_2$ atmosphere and held there for 6 hr before changing the atmosphere to air, and continuing the calcination for another 6 hr. A solution was prepared by diluting 50 g $HNO_3$ (69%) in 88 g de-ionized water. The solution was heated to 98° C. before adding the calcined UZM-8. The slurry was stirred for 4 hr at 98° C. The product was isolated by filtration, washed with de-ionized water, and dried at 75° C. for 12 hr.

The product was identified as UZM-8HS via x-ray powder diffraction analysis. Characteristic diffraction lines for the product are listed in Table 6. Elemental analyses showed the Si/Al ratio to be 24.82, while $N_2$ adsorption measurements gave a BET surface area of 449 m²/g with a micropore volume of 0.12 cc/g.

TABLE 6

| 2-θ | d(Å) | I/I$_o$ % |
|---|---|---|
| 4.30 | 20.56 | vs |
| 7.14 | 12.37 | m |
| 8.38 | 10.55 | m |
| 12.64 | 7.00 | w |
| 14.44 | 6.13 | m |
| 19.92 | 4.45 | w |
| 22.62 | 3.93 | s |
| 25.20 | 3.53 | w |
| 26.07 | 3.42 | m |
| 33.30 | 2.69 | w |

EXAMPLE 7

An aluminosilicate reaction mixture was prepared by adding 80.44 g of Al (Osec-Bu)$_3$ (95+%) to 732.97 g of DED-MAOH (20%) with vigorous stirring. This was followed by the addition of 252.7 g of Ultrasil™ VN SP (85%) silica. A solution containing 12.67 g NaOH dissolved in 321.22 g distilled water was prepared and added slowly to the aluminosilicate mixture with mixing. The resultant mixture was homogenized for 30 minutes with a high-speed stirrer. The reaction mixture was placed in a 2 L stirred autoclave at 150° C. for 285 hours at autogenous pressure. The solid product was isolated by filtration, washed with distilled water, and dried at room temperature.

Analysis by powder x-ray diffraction showed the product to have the UZM-8 structure. Characteristic diffraction lines for the product are listed in Table 7. The UZM-8 sample was ammonium ion-exchanged using a solution that contained 1 g $NH_4NO_3$ dissolved in 10 g de-ionized water for every gram of UZM-8. The exchange was carried out twice at 80° C. for two hr, with thorough washing following each exchange. A portion of the product was calcined under a flow of nitrogen for 6 hr at 540° C. The composition of the calcined product exhibited the following mole ratios as determined by elemental analysis: Si/Al=10.51, and Na/Al=0.015. The BET surface area of the calcined material was 432 m²/g and the micropore volume was 0.14 cc/g.

TABLE 7

| 2-θ | d(Å) | I/I$_o$ % |
|---|---|---|
| 3.02 | 29.23 | m |
| 6.52 | 13.54 | m |
| 7.08 | 12.47 | s |
| 8.56 | 10.32 | vs |
| 13.11 | 6.75 | w |
| 14.31 | 6.19 | w |
| 19.94 | 4.45 | s |
| 22.34 | 3.98 | vs |
| 24.94 | 3.57 | m |
| 25.92 | 3.43 | vs |
| 26.44 | 3.37 | m |
| 31.44 | 2.84 | w |
| 33.32 | 2.69 | w |
| 36.28 | 2.47 | w |
| 37.64 | 2.39 | w |
| 45.99 | 1.97 | w |
| 48.16 | 1.89 | w |
| 52.06 | 1.76 | w |
| 65.27 | 1.43 | w |

EXAMPLE 8

A 113 g portion of the ammonium exchanged UZM-8 from Example 7 was acid extracted with a solution prepared by diluting 400 g $HNO_3$ (69%) in 67 g de-ionized water. The solution was heated to 98° C. before the addition of the ammonium exchanged UZM-8. The resulting slurry was stirred for 11 hr at 98° C. The product was isolated by filtration, washed with de-ionized water, and dried at 98° C.

The product was identified as UZM-8HS via powder x-ray diffraction analysis. Characteristic diffraction lines for the product are listed in Table 8. Elemental analyses showed the product to have a Si/Al ratio of 49.43. The product was calcined at 540° C. under nitrogen for 6 hrs. The BET surface area of this acid extracted UZM-8HS was 449 m²/g with a micropore volume of 0.14 cc/g.

TABLE 8

| 2-θ | d(Å) | I/I$_o$ % |
|---|---|---|
| 4.46 | 19.79 | w |
| 7.24 | 12.20 | vs |
| 8.51 | 10.38 | vs |
| 12.86 | 6.88 | w |
| 14.50 | 6.10 | vs |
| 19.80 | 4.48 | s |
| 22.66 | 3.92 | vs |
| 25.12 | 3.54 | w |
| 26.18 | 3.40 | vs |
| 26.86 | 3.32 | m |
| 29.29 | 3.05 | w |
| 33.65 | 2.66 | w |
| 37.90 | 2.37 | w |
| 46.61 | 1.95 | w |

TABLE 8-continued

| 2-θ | d(Å) | I/I₀% |
|---|---|---|
| 52.08 | 1.75 | w |
| 65.74 | 1.42 | w |

EXAMPLE 9

A 70 g portion of the UZM-8 ammonium exchanged from Example 7 was acid extracted with a solution prepared by diluting 435 g HNO$_3$ (69%) in 14 g de-ionized water. The solution was heated to 98° C. before the addition of the ammonium exchanged UZM-8. The resulting slurry was stirred for 8.5 hr at 98° C. The product was isolated by filtration, washed with de-ionized water, and dried at 98° C.

The product was identified as UZM-8HS via powder x-ray diffraction analysis. Characteristic diffraction lines for the product are listed in Table 9. Elemental analyses showed the product to have a Si/Al ratio of 80.47. This sample was calcined at 540° C. under a nitrogen atmosphere for 4 hrs. The BET surface area of acid extracted UZM-8HS was 452 m$^2$/g with a micropore volume of 0.15 cc/g.

TABLE 9

| 2-θ | d(Å) | I/I₀% |
|---|---|---|
| 4.64 | 19.03 | m |
| 6.60 | 13.39 | m |
| 7.18 | 12.30 | vs |
| 8.47 | 10.43 | vs |
| 12.86 | 6.88 | w |
| 14.46 | 6.12 | s |
| 16.15 | 5.48 | w |
| 19.89 | 4.46 | w |
| 22.67 | 3.92 | vs |
| 25.18 | 3.53 | w |
| 26.24 | 3.39 | vs |
| 26.88 | 3.31 | m |
| 33.33 | 2.69 | w |
| 38.03 | 2.36 | w |
| 46.36 | 1.96 | w |
| 49.23 | 1.85 | w |

EXAMPLE 10

A 70 g portion of the UZM-8 ammonium exchanged from Example 7 was acid treated with a solution prepared by diluting 535 g HNO$_3$ (69%) in 14 g de-ionized water. The solution was heated to 98° C. before the addition of the ammonium exchanged UZM-8. The resulting slurry was stirred for 15 hr at 98° C. The products were isolated by filtration, washed with de-ionized water, and dried at 98° C.

The product was identified as UZM-8HS by powder x-ray diffraction analysis. Characteristic diffraction lines for the product are listed in Table 10. Elemental analyses showed the product to have a Si/Al ratio of 122. This sample was calcined at 540° C. under nitrogen for 4 hrs. The BET surface area of this acid extracted UZM-8HS was 466 m$^2$/g with a micropore volume of 0.15 cc/g.

TABLE 10

| 2-θ | d(Å) | I/I₀% |
|---|---|---|
| 4.34 | 20.34 | w |
| 6.53 | 13.53 | w |

TABLE 10-continued

| 2-θ | d(Å) | I/I₀% |
|---|---|---|
| 7.20 | 12.27 | vs |
| 8.64 | 10.22 | m |
| 12.80 | 6.91 | w |
| 14.48 | 6.11 | w |
| 16.10 | 5.50 | w |
| 19.84 | 4.47 | w |
| 22.64 | 3.92 | vs |
| 25.19 | 3.53 | w |
| 26.20 | 3.40 | vs |
| 26.86 | 3.32 | m |
| 31.96 | 2.80 | w |
| 33.72 | 2.66 | w |

EXAMPLE 11

A UZM-8 sample was prepared by first adding 732.97 g DEDMAOH (20%) to a large beaker followed by the addition of 80.44 g Al sec-butoxide (97%) with vigorous mixing. Then 248.5 g de-ionized water was added to the mixture which was allowed to stir further. Then 252.70 g Ultrasil VN SP (89% SiO$_2$) was added which led to the formation of a thick gel, which was vigorously mixed. Separately, 8.50 g NaOH was dissolved in 73 g de-ionized water. The latter solution was added to the gel, again while mixing. Finally 16 g UZM-8 seed was added and the mixture was homogenized for an additional 20 minutes. This reaction mixture was transferred to a Parr 2L stirred reactor where it was digested at 150° C. for 185 hr. The product was isolated by filtration, washed with de-ionized water and dried in air. The product was identified as UZM-8 by powder x-ray diffraction.

A portion of this sample was ammonium exchanged using 1 g NH$_4$NO$_3$ dissolved in 10 g de-ionized water for every gram of UZM-8. The exchanges were carried out twice, heating the mixture to 80° C. for 2 hr with thorough washes after each exchange. Elemental analysis showed this material to have an Si/Al ratio of 10.35.

This ammonium exchanged UZM-8 was treated with ammonium hexafluorosilicate to give a dealuminated UZM-8HS. A 3.16 g sample of ammonium hexafluorosilicate was dissolved in 60.10 g de-ionized water. In a separate beaker, 131.45 g of the ammonium exchanged UZM-8 was suspended in 330.5 g de-ionized water and the slurry was heated to 80° C. The ammonium hexafluorosilicate solution was delivered to the zeolite slurry with a pump at a rate of about 0.52 cc/min. Once the addition was completed, the slurry was held at 80° C. for an additional hour. The product was isolated by filtration and washed with 5 liters of de-ionized water and dried at room temperature.

The product was identified as UZM-8HS via powder x-ray diffraction and elemental analysis. Characteristic diffraction lines for the product are given in table 11. The Si/Al ratio determined from elemental analysis was 11.89, representing a 12% decrease in aluminum content in the zeolite. The product was calcined and subjected to nitrogen adsorption measurements, which yielded a BET surface area of 514 m$^2$/g and a micropore volume of 0.13 g/cc.

TABLE 11

| 2-θ | d(Å) | I/I₀% |
|---|---|---|
| 6.38 | 13.85 | w |
| 7.08 | 12.48 | s |

TABLE 11-continued

| 2-θ | d(Å) | I/I$_o$ % |
|---|---|---|
| 8.58 | 10.30 | vs |
| 12.68 | 6.98 | w |
| 14.27 | 6.20 | w |
| 15.57 | 5.69 | w |
| 19.76 | 4.49 | m |
| 22.30 | 3.98 | m |
| 24.84 | 3.58 | w |
| 25.90 | 3.44 | s |
| 26.64 | 3.34 | m |
| 31.49 | 2.84 | w |
| 33.02 | 2.71 | w |
| 37.57 | 2.39 | w |

We claim as our invention:

1. A microporous crystalline zeolite having a three-dimensional framework of at least AlO$_2$ and SiO$_2$ tetrahedral units and an empirical composition on an anhydrous basis in terms of mole ratios of the elements of:

$$M1_a{}^{n+}Al_{(1-x)}E_xSi_{y'}O_{z''}$$

where M1 is at least one exchangeable cation selected from the group consisting of alkali metals, alkaline earth metals, rare earth metals, ammonium ion, hydrogen ion and mixtures thereof, a is the mole ratio of M1 to (Al+E) and varies from 0.05 to about 50, E is an element selected from the group consisting of gallium, iron, boron, chromium, indium and mixtures thereof, x is the mole fraction of E and varies from 0 to about 1.0, n is the weighted average valence of M1 and has a value of about +1 to about +3, y' is the mole ratio of Si to (Al+E) and is greater than about 6.5 and z" is the mole ratio of O to (Al+E) and has a value determined by the equation:

$$z''=(a \cdot n+3+4 \cdot y')/2$$

the zeolite characterized in that it has an x-ray diffraction pattern having at least the d-spacings and relative intensities set forth in Table B:

TABLE B

| 2-θ | d(Å) | I/I$_o$ % |
|---|---|---|
| 6.90-7.40 | 12.80-11.94 | w-vs |
| 8.15-8.66 | 10.84-10.21 | m-vs |
| 14.10-14.70 | 6.28-6.02 | w-vs |
| 19.40-20.10 | 4.57-4.41 | w-s |
| 22.00-22.85 | 4.04-3.89 | m-vs |
| 24.65-25.40 | 3.61-3.50 | w-m |
| 25.70-26.50 | 3.46-3.36 | w-vs. |

2. The zeolite of claim 1 where M1 is selected from the group consisting of lithium, cesium, sodium, potassium, strontium, barium, calcium, magnesium, lanthanum, hydrogen ion, ammonium ion and mixtures thereof.

3. The zeolite of claim 2 where M1 is a hydrogen ion.

4. The zeolite of claim 1 where y' has a value from greater than about 6.5 to about 20,000.

5. The zeolite of claim 4 where y' has a value from greater than about 6.5 to about 3,000.

6. A process for preparing a modified microporous crystalline zeolite having a three-dimensional framework of at least AlO$_2$ and SiO$_2$ tetrahedral units and an empirical composition on an anhydrous basis in terms of mole ratios of the elements of:

$$M1_a{}^{n+}Al_{(1-x)}E_xSi_{y'}O_{z''}$$

where M1 is at least one exchangeable cation selected from the group consisting of alkali metals, alkaline earth metals, rare earth metals, ammonium ion, hydrogen ion and mixtures thereof, a is the mole ratio of M1 to (Al+E) and varies from about 0.05 to about 50, E is an element selected from the group consisting of gallium, iron, boron, chromium, indium and mixtures thereof, x is the mole fraction of E and varies from 0 to about 1.0, n is the weighted average valence of M and has a value of about +1 to about +3, y' is the mole ratio of Si to (Al+E) and is greater than about 6.5 and z" is the mole ratio of O to (Al+E) and has a value determined by the equation:

$$z''=(a \cdot n+3+4 \cdot y')/2$$

the zeolite characterized in that it has an x-ray diffraction pattern having at least the d-spacings and relative intensities of Table B, the process comprising treating a starting UZM-8 zeolite at treating conditions thereby removing at least a portion of the framework aluminum and optionally inserting silicon into the framework to provide the modified zeolite; the starting zeolite having an empirical formula on an anhydrous basis of:

$$M'_m{}^{n+}R_r{}^{p+}Al_{(1-x)}E_xSi_yO_z$$

where M' is an exchangeable cation selected from the group consisting of ammonium ion, hydrogen ion, alkali metals, alkaline earth metals, rare earth metals and mixtures thereof, n is the weighted average valence of M' and varies from +1 to about +3, m' is the mole ratio of M' to (Al+E) and varies from 0 to about 7.0, R is at least one organoammonium cation selected from the group consisting of protonated amines, protonated diamines, protonated alkanolamines, quaternary ammonium ions, diquaternary ammonium ions and quaternized alkanolammonium ions, p is the weighted average valence of the organic cation and varies from about +1 to about +2, r' is the mole ratio of R to (Al+E) and varies from 0 to about 7.0, r'+m'>0, x is the mole fraction of E and varies from 0 to about 1, y is the ratio of Si to (Al+E) and varies from about 6.5 to 35 and z' is the mole ratio of O to (Al+E) and has a value given by the equation:

$$z'=(m' \cdot n+r' \cdot p+3+4 \cdot y)/2.$$

7. The process of claim 6 where the treating comprises at least one treatment step selected from the group consisting of treatment with a fluorosilicate solution or slurry, extraction with an acid, calcination plus ion-exchange, calcination plus acid extraction, steaming plus ion-exchange and steaming plus acid extraction.

8. The process of claim 7 where the treating comprises at least two treatment steps, the first step comprising treatment with a fluorosilicate solution or slurry and at least one other step selected from the group consisting of extraction with an acid, calcination plus ion-exchange, calcination plus extraction, steaming plus ion-exchange and steaming plus acid extraction.

9. The process of claim 7 where the acid extraction is carried out by contacting the zeolite with an acid at a temperature of about 10° C. to about 100° C. for a time of about 10 minutes to about 24 hours to provide a modified zeolite.

10. The process of claim 9 where the acid is selected from the group consisting of nitric acid, sulfuric acid, EDTA, citric acid, oxalic acid and mixtures thereof.

11. The process of claim 7 where the steaming is carried out by steaming the zeolite at a temperature of about 400° C. to about 850° C. with from about 1% to about 100% steam, for a time of about 10 minutes to about 48 hours.

12. The process of claim 7 where the calcining is carried out by heating the zeolite at a temperature of about 300° C. to about 600° C. for a time of about 2 to about 24 hours.

13. The process of claim 7 where the ion exchange is carried out by contacting the zeolite with a solution comprising a cation selected from the group consisting of alkali metals, alkaline earth metals, rare earth metals, hydrogen ion, ammonium ion and mixtures thereof at a temperature of about 15° C. to about 100° C. and a time of about 20 minutes to about 50 hours.

14. The process of claim 7 where the treating with a fluorosilicate solution or slurry is carried out contacting the zeolite with a fluorosilicate solution or slurry at a pH of about 3 to about 7, a temperature of about 10° C. to about 100° C. and a time sufficient to remove at least a portion of the aluminum from the framework and insert silicon into the framework.

15. The process of claim 6 where the treating comprises first treatment with a fluorosilicate solution or slurry followed by steaming.

16. The process of claim 15 further comprising calcining the zeolite after steaming.

17. The process of claim 6 where the treating comprises first treatment with a fluorosilicate solution or slurry followed by calcining.

18. The process of claim 17 further comprising steaming the zeolite after calcining.

19. The process of claim 6 wherein before the treating, the starting zeolite is calcined under an ammonia atmosphere at a temperature of about 250° C. to about 600° C. for a time sufficient to produce the ammonium form of the zeolite.

* * * * *